Figure 1:
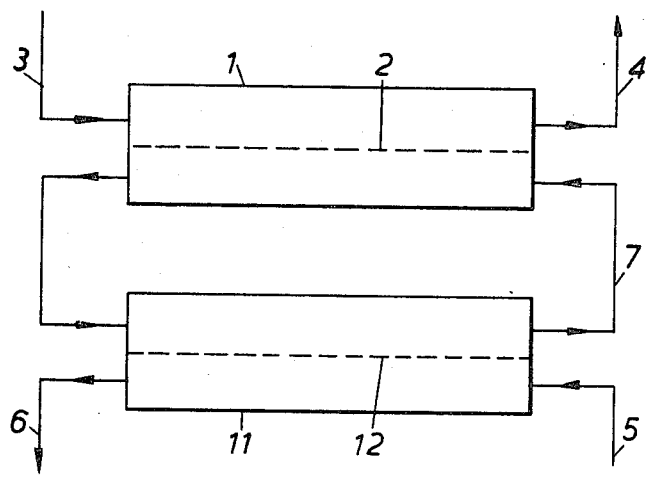

United States Patent [19]
Gigou et al.

[11] 3,839,200

[45] Oct. 1, 1974

[54] DIALYSIS APPARATUS

[75] Inventors: Claude Gigou, Vernaison; Jean-Pierre Quentin, Lyon, both of France

[73] Assignee: Rhone-Poulenc S.A., Paris, France

[22] Filed: Mar. 15, 1972

[21] Appl. No.: 234,940

[30] Foreign Application Priority Data
Mar. 17, 1971 France ............................. 71.09358

[52] U.S. Cl.................... 210/22, 210/259, 210/321
[51] Int. Cl....................... B01d 31/00, B01d 13/00
[58] Field of Search....................... 210/22, 321, 259

[56] References Cited
UNITED STATES PATENTS

| | | | |
|---|---|---|---|
| 3,004,909 | 10/1961 | Gregor et al. | 204/180 P |
| 3,247,133 | 4/1966 | Chen | 260/2.1 |
| 3,386,912 | 6/1968 | Lazare | 210/22 |
| 3,506,126 | 4/1970 | Serfass et al. | 210/321 X |
| 3,579,441 | 5/1971 | Brown | 210/321 X |
| 3,617,545 | 11/1971 | DuBois et al. | 210/321 X |
| 3,697,418 | 10/1972 | Johnson | 210/321 X |

*Primary Examiner*—Frank A. Spear, Jr.
*Attorney, Agent, or Firm*—Stevens, Davis, Miller & Mosher

[57] ABSTRACT

A dialysis apparatus, especially for the purification of blood, is provided which comprises:

a. a first dialyser and a dialysis membrane separating said dialyser into two compartments and an inlet and an outlet for the first compartment for the liquid to be treated; and b. a second dialyser and an ionic membrane separating said second dialyser into two compartments, the first compartment of said second dialyser being connected with the second compartment of the first dialyser so as to form a closed circuit, and the second compartment of this second dialyser being equipped with an inlet and an outlet for liquid.

10 Claims, 2 Drawing Figures

DIALYSIS APPARATUS

The present invention relates to a dialysis apparatus, especially for the purification of blood, as well as to a process for the regeneration of the dialysis bath.

The apparatus of the present invention comprises:

a. a first dialyser separated into two compartments by a dialysis membrane, the first compartment of this first dialyser being equipped with an inlet and an outlet for the liquid to be treated; and b. a second dialyser separated into two compartments by an ionic membrane, the first compartment of this second dialyser being connected to the second compartment of the first dialyser in such a way as to form a closed circuit, and the second compartment of this second dialyser being equipped with an inlet and an outlet for liquid.

The dialysers used as essential parts of the apparatus of this invention can be of any known type, in particular of the type described in French Pat. No. 1,597,874. The membranes, and hence the compartments of the dialysers themselves, can have for example, a planar, conical, spiral or tubular shape. It is to be understood that in this specification the term "membrane" includes hollow fibres acting as a membrane. Of course, a single dialyser can also be replaced by a number of such dialysers mounted in series or in parallel.

The dialysis membranes which can be used in the first dialyser of the apparatus of this invention can be of any known type. In effect, they are membranes which are permeable to water and to dissolved bodies of low molecular weight, whether they be ionisable, such as acids and salts, or non-ionisable such as urea, creatinine and sugars; the membranes should also be impermeable to solutes of high molecular weight, especially to the elements which occur in blood, such as fibrinogen, proteins, blood cells and platelets.

Suitable dialysis membranes which can be used in the first dialyser of the apparatus of this invention include membranes based on cellulose, cellulose acetate which is preferably partially saponified or vinyl acetate-vinyl alcohol copolymers; hydroxyethyl, hydroxypropyl, glycerol or glycidyl methacrylate homo- or copolymers; trimethyl-(2-hydroxy-3-methacryloyloxy-propyl)-ammonium chloride homo- or copolymers; polyvinylpyrrolidone; amylose; and copolymers of acrylonitrile/unsaturated monomer containing a sulphonic acid, amine or quaternary ammonium group, especially an acrylonitrile/methyallylsulphonic acid copolymer, which have undergone an aqueous heat treatment.

The so-called "ionic membranes" which are used in the second dialyser of the apparatus of this invention are membranes comprising at least one polymer possessing anion or cation exchange groups; these groups can be, more particularly carboxylic, sulphonic, phosphonic or phosphinic acid groups, optionally in the form of salts, or sulphonium, phosphonium or ammonium, especially quaternary ammonium groups.

It is preferable to use the membranes which have, on the one hand, a selective permeability as measured in French Pat. No. 1,584,187, greater than 50 percent, and preferably greater than 70 percent, and, on the other hand, a urea/NaCl selectivity greater than 5, and preferably greater than 10; the urea/NaCl selectivity ($S_{us}$) of a membrane is measured in the following way: an aqueous solution, 0.1 M in the urea and 0.1 M in NaCl, is put into the first compartment of a cell containing two compartments separated by the membrane, and an aqueous solution, the glucose concentration of which is such that the osmotic pressures of the two compartments are equal, is put into the second compartment: the selectivity, $S_{us}$, is equal to the ratio of the transfer coefficients of urea and of sodium chloride:

$S_{us} = {}^t\text{urea}/{}^t\text{NaCl}$ ; these coefficients can themselves be calculated from the equation $$\phi = A \cdot U \cdot \overline{\Delta C} \cdot T$$

in which:

$\phi$ is the weight of solute transferred across the membrane in the time interval T.

$\overline{\Delta C}$ is the logarithmic mean of the differences in concentration between the two compartments of the dialysis apparatus at the beginning and at the end of the time interval T, and A is the surface area of the membrane used.

The ionic membranes defined above may, if desired, be reinforced by an external or internal permeable support, for example a textile web; they can be woven or non-woven, and of a homogeneous or heterogeneous type.

Polymers or copolymers which may be used for the production of the ionic membranes for use in the apparatus of this invention, include: sulphonated sytrene-divinyl-benzene copolymers, chloromethylated and quaternised styrene-divinylbenzene copolymers, quaternised vinyl alcohol-vinylpyridine copolymers, sulphated ethylenevinyl alcohol copolymers, ethylenevinyl alcohol copolymers condensed with epichlorohydrin and then aminated, quaternised acrylonitrile-vinylpyridine copolymers, polycondensates obtained from polyhydroxyethers (polycondensation products of bisphenol with epichlorohydrin) by condensation with epichlorohydrin followed by amination, sulphonated polyarylethersulphones, sulphonated or chloromethylated and then aminated tetrafluoroethylene-styrene copolymers, and acrylonitrile-methallylsulphonic acid copolymers; these may be used in the form of salts. The apparatus of the invention can, in particular be used as artificial kidneys for the purification of blood and especially for the removal of waste materials such as urea. In this embodiment, the blood is subjected to an ordinary dialysis and the dialysis bath is regenerated.

The process of regeneration of this dialysis bath forms another embodiment of this invention. This process of continuous regeneration of a dialysis bath, which passes, in closed circuit, successively through a haemodialyser and through an auxiliary dialyser, is characterised by the fact that the dialysis bath flows in the auxiliary dialyser in contact with one face of an ionic membrane, and the second face of the said membrane is in contact with a purification liquid for the dialysis bath, this liquid having an osmotic pressure less than or equal to the osmotic pressure of the dialysis bath.

The present invention will now be illustrated, merely by way of example, with reference to the accompanying drawings in which FIG. 1 illustrates, diagrammatically, an apparatus of the present invention.

FIG. 1 represents an apparatus of the invention used as an artificial kidney; a first dialyser containing an ordinary dialysis membrane is shown at 1, the membrane itself being at 2; a second dialyser is at 11, an ionic membrane being at 12. The first compartment of the first dialyser 1, is supplied, via a pipeline 3, with blood coming from a blood vessel of the individual subjected to treatment; a pipeline 4 allows the blood to be removed and to be reinjected into a vein of the patient; a dialysis bath flows in a closed circuit 7. The purification liquid for the dialysis bath, introduced at 5 and removed at 6, flows in the second compartment of the second dialyser. The flow of the various fluids can be created by means of pumps (not shown).

The dialysis bath flowing in 7 may have a composition similar to that of dialysis baths usually used in artificial kidneys operating by dialysis; in practice, it is an aqueous solution containing, in kind and in amount, the products which are susceptible to dialysis but which must not be removed from the blood; more precisely, the dialysis bath contains, in general, NaCl, KCl, $MgCl_2$, $CaCl_2$, $CH_3COONa$ and, optionally, glucose; naturally, downstream from the haemodialyser, this dialysis bath also contains waste materials coming from the blood, in particular urea.

Dialysis baths which can be used are described, for example, in Trans. Amer. Soc. Artif. Int. Organs (1967) 13, page 5 and page 249. These compositions can, however, be adapted by the doctor in charge to take account of the particular characteristics of the patient.

The osmotic pressure of the dialysis bath is in practice less than or equal to that of the blood; the adjustment of this osmotic pressure can be carried out by any known means, for example by the addition of sugars to the dialysis bath, or by creating a reduced pressure in this bath with the help of a pump.

The purification liquid for the dialysis bath is an aqueous solution which has an osmotic pressure which is less than or equal to that of the dialysis bath; usually, this solution simply consists of water; the osmotic pressure can be adjusted as outlined above, either by lowering the pressure, or by the addition of an additive. Preferably, the same additive is used to adjust the osmotic pressures of the dialysis bath and of the purification liquid. The osmotic pressure of the purification liquid of the dialysis bath can be constant, or can, alternatively, be variable; in particular, the osmotic pressure can be made equal to the osmotic pressure of the dialysis bath during certain periods of time, and then lower than this latter osmotic pressure during other periods of time: in this way, temporary and intermittent micturition is, for practical purposes, achieved with human control.

The apparatus of the invention can also include safety devices, especially particle filters and bubble traps. The particle filters have the principal purpose of preventing the introduction of coagulated material into the blood for recirculation to the patient, and the bubble traps have the principal purpose of preventing the introduction of air into this blood; these various safety devices are advantageously located in the pipeline 4.

The apparatus and the process of the invention have the particular advantage of providing small equipment, which makes it possible to produce portable artificial kidneys; furthermore, they make it possible to avoid the consumption of large quantities of dialysis bath which is quite a costly product because of the precise and complex nature of its composition.

Figure 2:
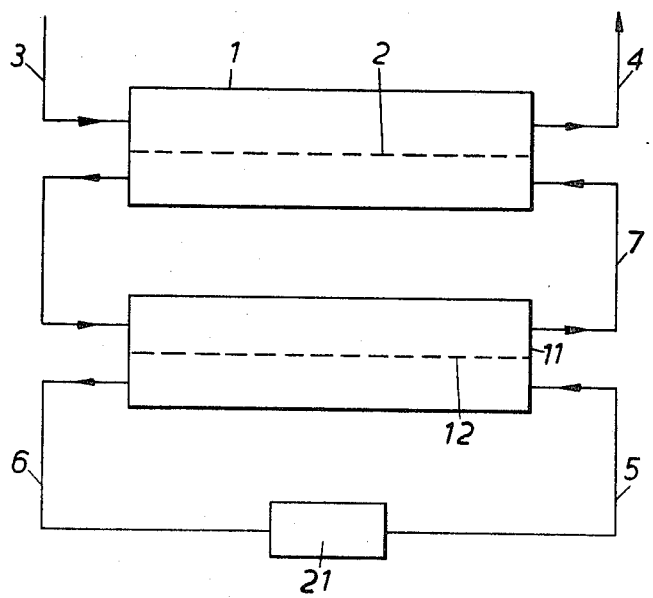

The apparatus and the process of this can be made even better such that the purification liquid for the dialysis bath flows in a closed circuit, passing successively through the second dialyser of the apparatus of the invention and through a device for removing waste material; in this embodiment, the liquid inlet and liquid outlets of the second compartment of the second dialyser are connected to the device for removing waste material. This embodiment is illustrated in FIG. 2; it can be seen that it differs from the apparatus of FIG. 1 only by the addition of a device 21 for removal of waste material. This removal device can be, for example, an absorption device in the most general sense of the term, thus including adsorption devices. The removal can be effected by a physical or chemical mechanism. Typical such devices are active charcoal columns and ion exchange resin columns. The waste materials concerned are essentially urea, uric acid and creatinine.

The following Example further illustrates the present invention.

EXAMPLE

The purification of human blood having a urea content of 1.65 g/litre is carried out in an apparatus similar to that illustrated in FIG. 1.

The membrane 2 of the dialyser 1 is of regenerated cellulose; its surface area is 0.78 $m^2$, its thickness is 13 $\mu$ (in the dry state) and its permeability to water is 1.2 $cm^3$/hour mm. Hg.$m^2$.

The membrane 12 of the dialyser 11 has a surface area of 6.7 $m^2$, a thickness of 33 $\mu$ (in the dry state), a permeability of 84 percent and a selectivity $S_{us}$ of 40; it is made of a polymer produced in the following way:

A 2,2-bis(hydroxyphenyl)-propane/epichlorohydrin polycondensate (reduced viscosity, measured at 25°C as a 2 g./l. solution in dimethylformamide, 36 $cm^3$/g) is condensed with epichlorohydrin at 62°C in the presence of $BF_3$ etherate; the product obtained (%Cl : 8.1 percent) is aminated by a solution of $(CH_3)_3N$ in dimethylformamide at 70°C; it contains 1.95 percent of nitrogen and 7.17 percent of chlorine.

The blood flows in the dialyser 1 at the rate of 200 $cm^3$/min.

The dialysis bath flows in the pipeline 7 with a flow rate of 950 $cm^3$/min; its composition is as follows: NaCl = 5.85 g/l; KCl = 0.112 g/l; $MgCl_2$. $6H_2O$ = 0.152 g/l; $CH_3COONa$. $3H_2O$ = 4.76 g/l; $CaCl_2$. $6H_2O$ = 0.328 g/l.

The purification liquid of the dialysis bath has a flow rate of 9 l/min. and contains 56 g/l. of glucose.

A clearance of urea of 70 $cm^3$/min is obtained, the loss of NaCl being 3g/hour. [The clearance is the hypothetical flow rate of blood from which the urea has been supposedly completely removed, the remainder of the blood being considered as retaining its initial urea concentration].

We claim:

1. A dialysis apparatus, especially for the purification of blood, which consists essentially of:
    a. a first dialyser and a dialysis membrane separating said dialyser into two compartments and an inlet and an outlet for the first compartment for the liquid to be treated; and
    b. a second dialyser and an ionic membrane separating said second dialyser into two compartments, the first compartment of said second dialyser being connected with the second compartment of the first dialyser so as to form a closed circuit, and the second compartment of this second dialyser being equipped with an inlet and an outlet for liquid, the ionic membrane having a selective permeability greater than 50 percent and urea/NaCl selectivity greater than 5.

2. Apparatus according to claim 1 in which the ionic membrane has a selective permeability greater than 70 percent and a urea/NaCl selectively greater than 10.

3. Apparatus according to claim 1 in which the ionic membrane contains carboxylic, sulphonic, phosphonic or phosphinic acid groups or salts thereof, or sulphonium, phosphonium or ammonium groups.

4. Apparatus according to claim 1 in which the ionic membrane comprises a sulphonated styrene-divinylbenzene copolymer, a chloromethylated and quaternised styrene-divinylbenzene copolymer, a quaternised vinyl alcohol-vinylpyridine copolymer, a sulphated ethylene-vinyl alcohol copolymer, an ethylene-vinyl alcohol copolymer condensed with eipchlorohydrin and then aminated, a quaternised acrylonitrile-vinylpyridine copolymer, epichlorohydrin polycondensate obtained from polyhydroxyethers (polycondensation products of bisphenol with epichlorohydrin) by condensation with epichlorohydrin followed by amination, a sulphonated polyarylethersulphone, a sulphonated or chloromethylated and then aminated tetrafluoroethylene-styrene copolymer or an acrylonitrile methallylsulphonic acid copolymer or a salt thereof.

5. Apparatus according to claim 1 in which the dialysis membrane comprises cellulose acetate, a vinyl acetate-vinyl alcohol copolymer, a hydroxyethyl, hydroxypropyl, glycerol or glycidyl methacrylate homo- or co-polymer, a trimethyl-(2-hydroxy-3-methacryloyloxypropyl)ammonium chloride homo- or co-polymer, polyvinylpyrrolidone, amylose or an acrylonitrile/unsaturated monomer containing a sulphonic acid, amine or quaternary ammonium group copolymer.

6. Apparatus according to claim 1 in which a device for the removal of blood waste products, especially urea is connected to the inlet and outlet from the second compartment of the second dialyser.

7. Apparatus according to claim 6 in which the device is an activated charcoal or ion-exchange resin column.

8. In a process for the continuous regeneration of the dialysis bath coming from a haemodialyser the improvement which consists essentially of passing the bath in closed circuit from the haemodialyser through an auxiliary dialyser equipped with an ionic membrane having a selective permeability greater than 50 percent and a urea/NaCl selectivity greater than 5, the second compartment of the auxiliary dialyser being traversed by a purifying liquid which has an osmotic pressure lower than or equal to the osmotic pressure of the bath.

9. Process according to claim 8 in which the purifying liquid is water or an aqueous sugar solution.

10. A dialysis bath regenerated by a process as defined in claim 8.

* * * * *